United States Patent
Jang et al.

(10) Patent No.: US 7,898,961 B2
(45) Date of Patent: Mar. 1, 2011

(54) METHOD AND APPARATUS FOR DYNAMICALLY MANAGING A PACKET SEGMENT THRESHOLD ACCORDING TO A WIRELESS CHANNEL STATE

(75) Inventors: Kyung-hun Jang, Suwon (KR); Hyo-sun Hwang, Suwon (KR); Jong-ae Park, Yongin (KR)

(73) Assignee: Samsung Electronics Co., Ltd., Suwon, Kyungki-do (KR)

( * ) Notice: Subject to any disclaimer, the term of this patent is extended or adjusted under 35 U.S.C. 154(b) by 1346 days.

(21) Appl. No.: 10/652,041

(22) Filed: Sep. 2, 2003

(65) Prior Publication Data
US 2004/0042453 A1 Mar. 4, 2004

(30) Foreign Application Priority Data
Aug. 31, 2002 (KR) .................. 10-2002-0052288

(51) Int. Cl.
 *H04L 1/00* (2006.01)
(52) U.S. Cl. .................... 370/236; 370/278; 370/282
(58) Field of Classification Search .................. 370/338, 370/236, 278, 282, 470–477; 455/69
See application file for complete search history.

(56) References Cited

U.S. PATENT DOCUMENTS

| 4,841,526 | A |   | 6/1989  | Wilson et al. |
| 4,941,144 | A |   | 7/1990  | Mizukami |
| 5,862,171 | A | * | 1/1999  | Mahany ................ 375/132 |
| 5,889,772 | A | * | 3/1999  | Fischer et al. ........... 370/346 |
| 5,946,631 | A | * | 8/1999  | Melnik ................ 455/522 |
| 6,560,243 | B1 | * | 5/2003  | Mogul ................ 370/468 |
| 6,606,482 | B1 | * | 8/2003  | Wheeler ............... 455/11.1 |
| 6,700,902 | B1 | * | 3/2004  | Meyer ................. 370/468 |
| 6,724,746 | B1 | * | 4/2004  | Linden ................ 370/349 |
| 6,889,257 | B1 | * | 5/2005  | Patel .................. 709/232 |
| 6,980,569 | B1 | * | 12/2005 | Beyda et al. ............ 370/516 |
| 7,076,204 | B2 | * | 7/2006  | Richenstein et al. ....... 455/3.06 |
| 7,154,854 | B1 | * | 12/2006 | Zweig et al. ............ 370/236 |
| 2004/0028003 | A1 | * | 2/2004 | Diener et al. ........... 370/319 |
| 2006/0140218 | A1 | * | 6/2006 | Winterton ............... 370/476 |

FOREIGN PATENT DOCUMENTS
EP 1 168 704 1/2002
JP 2001-024575 A 1/2001

* cited by examiner

*Primary Examiner* — William Trost, IV
*Assistant Examiner* — Roberta A Shand
(74) *Attorney, Agent, or Firm* — Lee & Morse, P.C.

(57) ABSTRACT

A method for managing a segment threshold includes determining whether a packet has been transmitted to a predetermined terminal, receiving from the predetermined terminal a response message indicating that the predetermined terminal has received the packet without any errors, if a packet has been transmitted to the predetermined terminal, receiving signal intensity data of a current packet transmitted from the predetermined terminal, and adjusting the segment threshold using the received signal intensity data of a current packet, if the response message has been received.

17 Claims, 3 Drawing Sheets

METHOD AND APPARATUS FOR DYNAMICALLY MANAGING A PACKET SEGMENT THRESHOLD ACCORDING TO A WIRELESS CHANNEL STATE

BACKGROUND OF THE INVENTION

1. Field of the Invention

The present invention relates to a method of adjusting a size of a packet transmitted from a wireless communications system. More particularly, the present invention relates to a method and an apparatus for dynamically managing a packet segment threshold that are capable of reducing the frequency of packet transmission errors by monitoring a state, i.e., a condition, of a wireless channel and dynamically varying the packet segment threshold depending on the wireless channel state.

2. Description of the Related Art

In a wired communications system, communication channels are relatively stable in terms of operation. Accordingly, segment threshold, transmission power, retransmission technique variables, and forward error correction (FEC) levels, which are used as system parameters, generally have fixed values. However, in terms of channel environment, wireless communications are quite different from wired communications. Therefore, if protocols that are used in wired communications are directly applied to wireless communications, a significant amount of packet loss may occur depending on a state, i.e., a condition, of a channel. Accordingly, wireless communications require new protocols capable of flexibly and adaptively responding to characteristics and a state of a communications channel that may vary considerably from moment-to-moment.

In a conventional wireless communications system, each access point (AP) determines a fixed packet segment threshold used by wireless terminals, with consideration of a corresponding frequency band and service area thereof. Segment threshold, which represents the maximum packet size when transmitting data on a packet-by-packet basis, directly affects transmission throughput, i.e., the amount of data transmitted from one place to another at any given period of time.

If the segment threshold for transmitting a packet is set high, packet overhead decreases. In this case, a better channel environment results in higher throughput, and a poorer channel environment results in greater data loss. Greater data loss indicates more frequent retransmission requests. Alternately, if the segment threshold is set low, packet overhead increases. In this case, a superior channel environment results in lower throughput, and a poorer channel environment decreases the likelihood of data loss. Therefore, in order to increase throughput and reduce data loss in a wireless communications system, segment threshold needs to vary depending on a current state of a wireless communications channel.

SUMMARY OF THE INVENTION

The present invention provides a reduction of packet transmission errors by monitoring a state of a wireless communications channel and by dynamically varying a segment threshold according to a temporal and spatial channel state.

According to an embodiment of the present invention, a method for managing a segment threshold includes determining whether a packet has been transmitted to a predetermined terminal, receiving from the predetermined terminal a response message indicating that the predetermined terminal has received the packet without any errors, if a packet has been transmitted to the predetermined terminal, receiving signal intensity data of a current packet transmitted from the predetermined terminal, and adjusting the segment threshold using the received signal intensity data of a current packet, if the response message has been received.

Preferably, the method includes determining whether a packet has been received by the predetermined terminal, if a packet has not been transmitted to the predetermined terminal.

Preferably, the method includes reducing the segment threshold to a predetermined setting value, if a response message for the transmitted packet has not yet been received and it is determined that packet loss has occurred.

Also preferably, the method includes increasing a segment threshold incremental rate, if a value of the received signal intensity data of the current packet is greater than a predetermined value, and decreasing the segment threshold incremental rate, if the value of the received input-signal intensity data is less than the predetermined value.

Preferably, the method includes adjusting the segment threshold depending on a segment threshold incremental rate, which has been set in proportion to the received signal intensity data of the current packet.

Preferably, the method includes setting the segment threshold to a smaller value between a predetermined maximum threshold value and a value obtained by multiplying a current segment threshold value by a value obtained by raising 2 to the power of the signal intensity level as expressed in the following equation:

$$\text{Thres\_value} = \min[\text{Max\_Thres}, (\text{Thres\_value} \times 2^{\text{Sig\_level}})] \quad (1)$$

wherein Sig_level, Thres_value, and Max_Thres represent the signal intensity level, a current segment threshold value, and a maximum segment threshold value, respectively.

According to another embodiment of the present invention, a method for managing a segment threshold includes receiving signal intensity information of a current packet from a receiving party that receives a packet transmitted from a sending party and dynamically adjusting the size of future transmission packets based on the received signal intensity information of the current packet.

Preferably, the method includes determining a size of future transmission packets in proportion to the received signal intensity information of the current packet.

Also preferably, the method includes decreasing a size incremental rate for transmission packets, if the received signal intensity information of the current packet has a small value, and increasing the size incremental rate for transmission packets, if the received signal intensity information of the current packet has a large value.

According to still another embodiment of the present invention, an apparatus for managing a segment threshold includes a plurality of packet transmission result input units, each of which receives a response message indicating that a packet has been successfully transmitted to a predetermined terminal without any errors, a plurality of received signal-intensity input units, each of which receives signal intensity information corresponding to a packet received by the predetermined terminal, a segment threshold adjustment unit for calculating and for adjusting the segment threshold based on whether the response message has been received and based on the input-signal intensity information, and a segment threshold management unit for outputting segment threshold information for performing packet segmentation according to the segment threshold adjusted by the segment threshold adjustment unit.

Preferably, the segment threshold adjustment unit decreases the size of a transmission packet if the received signal intensity information has a small value, and increases the size of the transmitted packet if the received signal intensity information has a large value.

Also preferably, the segment threshold adjustment unit decreases a size incremental rate for transmission packets if the received signal intensity information has a small value, and increases the size incremental rate for transmission packets if the received input-signal intensity information has a large value.

Preferably, the segment threshold management unit selects predetermined segment threshold information, corresponding to a target terminal to which data is to be transmitted from among segment threshold information input from the segment threshold adjustment unit, and outputs the predetermined segment threshold information so that a packet segmentation unit can perform packet segmentation based on the predetermined segment threshold information.

According to still another embodiment of the present invention, a computer-readable recording medium includes a program enabling the above-mentioned method recorded thereon.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE INVENTION

Figure 1:
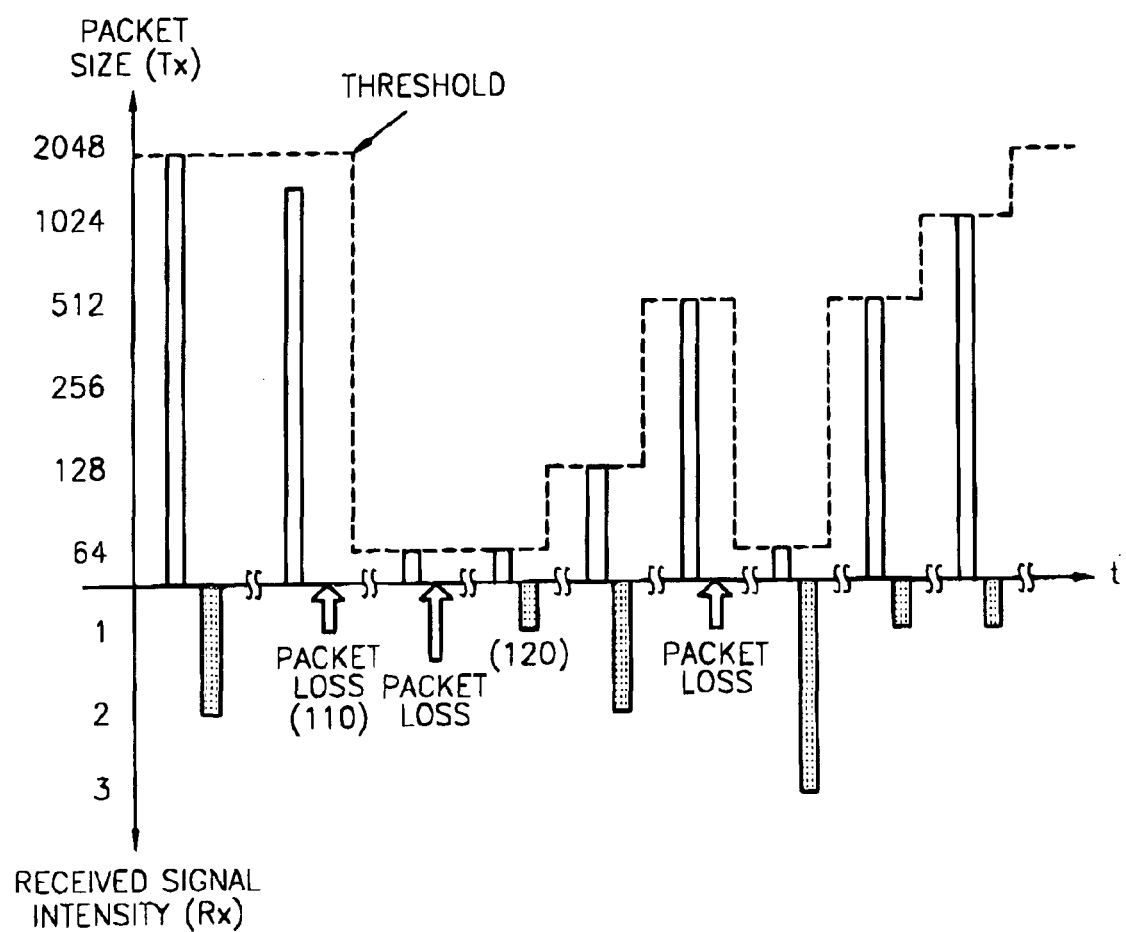
FIG. 1 is a graph illustrating a method for dynamically managing a segment threshold according to a preferred embodiment of the present invention.

Korean Patent Application No. 2002-52288, filed on Aug. 31, 2002, and entitled: "Method for Dynamically Managing a Packet Segment Threshold According to a Wireless Channel State," is incorporated by reference herein in its entirety.

The present invention will now be described more fully hereinafter with reference to the accompanying drawings, in which preferred embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

FIG. 1 is a graph illustrating a method for dynamically adjusting a segment threshold according to a preferred embodiment of the present invention. More specifically, FIG. 1 will be described in connection with the following paragraphs that describe a process of setting a segment threshold to a predetermined value based on whether a response signal ACK has been received and based on an intensity of input signals. Data is transmitted in a packet having size (Tx) after a predetermined value is set as the segment threshold. If packet loss occurs during data transmission, e.g., at a location indicated by reference numeral 110, a minimum segment threshold value provided in advance is set as the segment threshold. If no additional packet loss occurs, the segment threshold gradually increases.

If an intensity of a received packet signal (Rx) is low, e.g., at a location indicated by reference numeral 120, the extent to which the segment threshold gradually increases is small. Alternately, if the intensity of the received packet signal is high, the extent to which the segment threshold gradually increases is adjusted using a predetermined method. This process determines the size (Tx) of a packet transmitted by each terminal. Thus, each terminal is required to have a segment threshold adjustment unit for dynamically adjusting a segment threshold and a segment threshold management unit for managing the segment threshold adjustment unit.

More particularly, the segment threshold adjustment unit decreases a size of a transmission packet if the received signal intensity information has a small value, and increases the size of the transmitted packet if the received signal intensity information has a large value. Thus, when signal intensity information of a current packet is received by a sending party from a receiving party, a size of future transmission packets may be dynamically adjusted based on received signal intensity information of the current packet.

In addition, a segment threshold incremental rate is increased if a value of the received signal intensity data of the current packet is greater than a predetermined value. The segment threshold incremental rate is decreased if the value of the received input-signal intensity data is less than the predetermined value. Further, the segment threshold is adjusted depending on the segment threshold incremental rate, which has been set in proportion to the received signal intensity data of the current packet, as described above.

Figure 2:
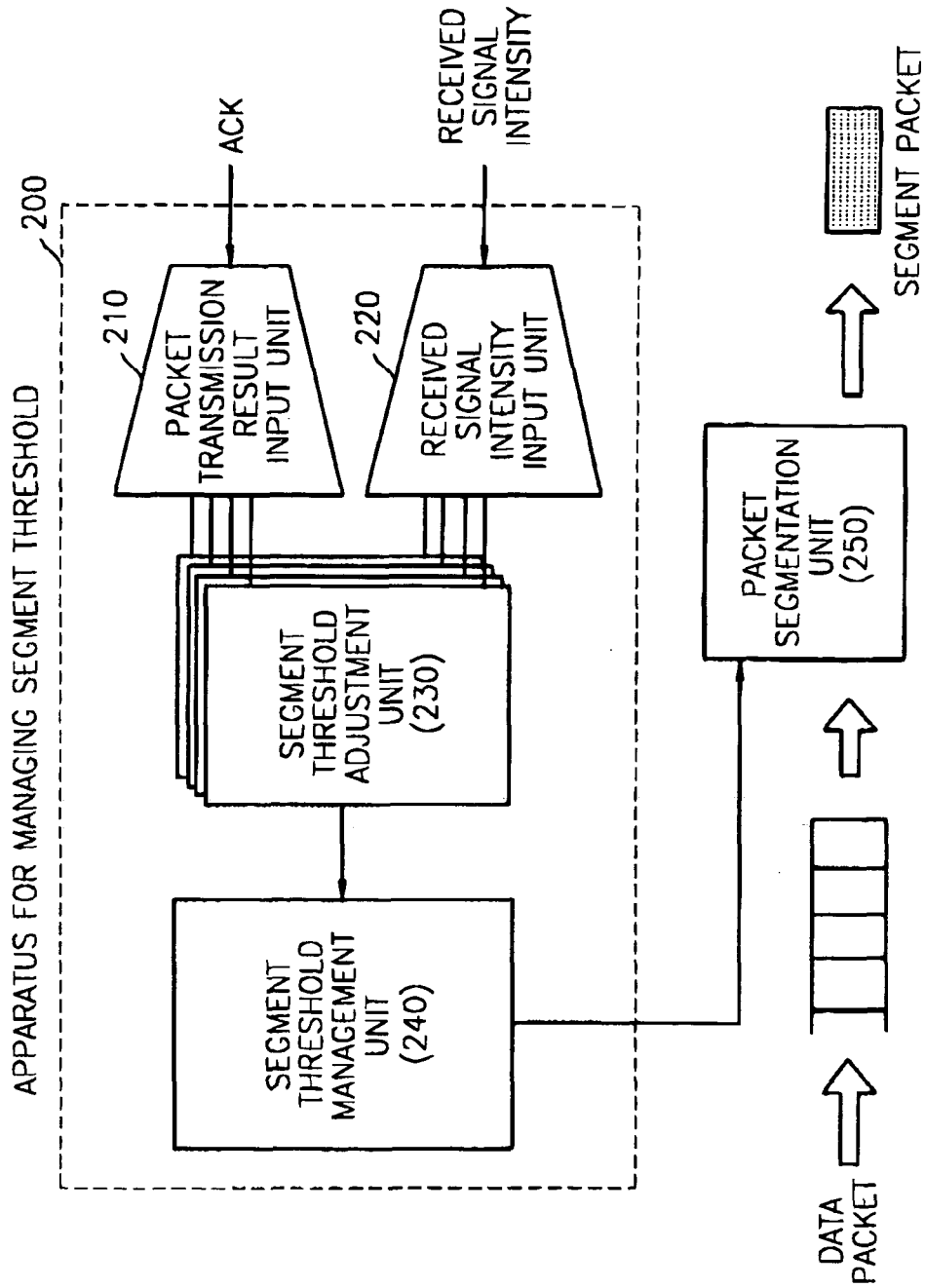
FIG. 2 is a block diagram of an apparatus for managing a segment threshold according to a preferred embodiment of the present invention.

FIG. 2 is a block diagram of an apparatus for managing a segment threshold according to a preferred embodiment of the present invention.

A segment threshold is adjusted depending on the intensity of an input signal and depending on whether a request is made for retransmission of a packet due to packet loss. Wireless communication terminals manage the segment threshold according to characteristics of the wireless communications channels. Therefore, each wireless communications terminal requires a segment threshold adjustment unit 230 and a segment threshold management unit 240 for managing the segment threshold adjustment unit 230. An apparatus including the segment threshold adjustment unit 230 and the segment threshold management unit 240 is called an apparatus for managing segment threshold 200.

Accordingly, an apparatus for managing segment threshold 200 according to the present invention includes a packet transmission result input unit 210, a received-signal intensity input unit 220, a segment threshold adjustment unit 230, and a segment threshold management unit 240. In addition, a packet segmentation unit 250 for performing packet segmentation according to information input from the segment threshold management unit 240 may be included.

In operation, the packet transmission result input unit 210 receives an ACK message, which is a response signal generated by a destination terminal when a packet has been successfully received. The received-signal intensity input unit 220 receives the intensity of all input packet signals. The segment threshold adjustment unit 230 calculates a segment threshold value based on the input packet signal intensities received from the received-signal intensity input unit 220 and based on whether the ACK message has been received, and adjusts the segment threshold accordingly. The process of calculating a segment threshold value will be described more fully below.

The segment threshold management unit 240 manages the segment threshold value calculated and adjusted by the segment threshold adjustment unit 230 and transmits the segment threshold value to the packet segmentation unit 250. The packet segmentation unit 250 performs packet segmentation based upon the received segment threshold value. More specifically, the segment threshold management unit 240 manages the segment threshold information from the segment threshold adjustment unit 230 and transmits the received segment threshold information to the packet segmentation unit 250. The packet segmentation unit 250 selects the segment threshold information of the destination terminal to which data is to be transmitted and performs packet segmentation based on the corresponding segment threshold information.

Each terminal receives the intensity of all packet signals input thereinto from the received-signal intensity input unit 220 and transmits the received intensity of all the input packet signals to the segment threshold adjustment unit 230. In addition, each terminal receives an ACK message from the packet transmission result input unit 210 and transmits information regarding packet loss to the segment threshold adjustment unit 230. The segment threshold adjustment unit 230 determines the segmentation threshold applied to each packet and the extent to which the segmentation threshold is to be increased.

Figure 3:
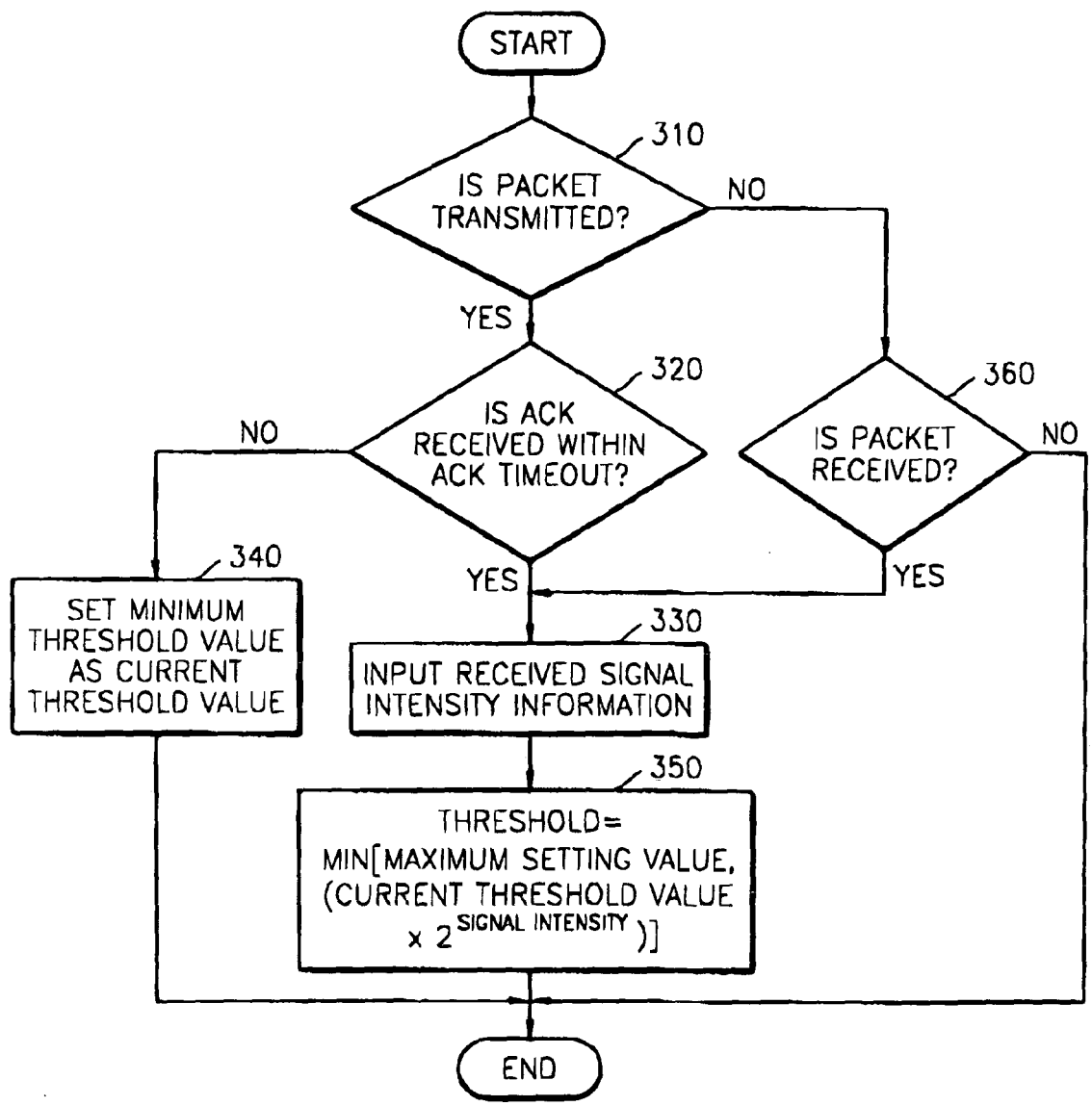
FIG. 3 is a flowchart illustrating the operation of a segment threshold adjustment unit according to a preferred embodiment of the present invention.

FIG. 3 is a flowchart illustrating an operation of the segment threshold adjustment unit 230. In step 310, it is determined whether a packet has been transmitted. If a packet has been transmitted, in step 320, it is determined whether an ACK message has been received within an ACK timeout period. If the ACK message has been received, then, in step 330, the segment threshold adjustment unit monitors all input packet signals, receives input-signal intensity, and determines a signal intensity level Sig_Level. More specifically, if the ACK message has been successfully received, in step 350, the segment threshold adjustment unit increases the segment threshold depending on the signal intensity level Sig_Level. The current segment threshold value is calculated using Equation (1) below:

$$\text{Thres\_value} = \min[\text{Max\_Thres}, (\text{Thres\_value} \times 2^{Sig\_level})] \quad (1)$$

wherein Sig_level, Thres_value, and Max_Thres represent the signal intensity level, a current segment threshold value, and a maximum segment threshold value, respectively.

The state of a wireless-communications channel can be successfully reflected into the segment threshold using Equation (1).

If the ACK message, which is a signal generated in response to the transmitted packet, has not yet been received, in step 340, it is determined that packet loss has occurred and the segment threshold is then decreased to a predetermined minimum value.

In steps 310, if no packet was transmitted but one was received, as determined in step 360, the method directly proceeds to step 330 where a signal intensity level is determined.

The embodiments of the present invention set forth herein may be written as a program that can be executed in a computer, and can be realized in a common digital computer with the help of a computer-readable recording medium.

The computer-readable recording medium includes a magnetic storage medium, such as ROM, a floppy disk, or a hard disk; an optical recording medium, such as CD-ROM, or a DVD; and a carrier wave, such as data transmission through the Internet.

According to the present invention, it is possible to dynamically vary the segment threshold value of each packet transmitted via a wireless communications channel according to a state of a wireless channel, which temporally and spatially varies. Therefore, it is possible to increase throughput, reduce the rate of packet loss and the number of packet retransmissions, and enhance the efficiency of the wireless communications channel.

Preferred embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A method for managing a segment threshold, comprising:
    (a) determining whether a packet has been transmitted to a predetermined terminal;
    (b) receiving from the predetermined terminal a response message indicating that the predetermined terminal has received the packet without any errors, if a packet has been transmitted to the predetermined terminal;
    (c) receiving signal intensity data of a current packet transmitted from the predetermined terminal; and
    (d) adjusting the segment threshold using the received signal intensity data of a current packet, if the response message has been received, wherein a segment threshold is calculated by performing a mathematical operation involving a current threshold value and the received signal intensity data of the current packet,
    wherein the mathematical operation represents setting the segment threshold to a smaller value between a predetermined maximum threshold value and a value obtained by multiplying a current segment threshold value by a value obtained by raising 2 to the power of the signal intensity level.

2. The method as claimed in claim 1, wherein (b) comprises:
    determining whether a packet has been received by the predetermined terminal, if a packet has not been transmitted to the predetermined terminal.

3. The method as claimed in claim 1, wherein (d) comprises:
    reducing the segment threshold to a predetermined setting value, if a response message for the transmitted packet has not yet been received and it is determined that packet loss has occurred.

4. The method as claimed in claim 1, wherein (d) comprises:
    increasing a segment threshold incremental rate, if a value of the received signal intensity data of the current packet is greater than a predetermined value; and
    decreasing the segment threshold incremental rate, if the value of the received input-signal intensity data is less than the predetermined value.

5. The method as claimed in claim 1, wherein (d) comprises:
    adjusting the segment threshold depending on a segment threshold incremental rate, which has been set in proportion to the received signal intensity data of the current packet.

6. The method as claimed in claim 1, wherein (d) comprises:
    setting the segment threshold to the smaller value between a predetermined maximum threshold value and the value obtained by multiplying the current segment threshold value by the value obtained by raising 2 to the power of the signal intensity level as expressed in the following equation:

$$\text{Thres\_value} = \min[\text{Max\_Thres}, (\text{Thres\_value} \times 2^{\text{Sig\_level}})] \quad (1)$$

wherein Sig_level, Thres_value, and Max_Thres represent the signal intensity level, a current segment threshold value, and a maximum segment threshold value, respectively.

7. A method for managing a segment threshold, comprising:
   (a) receiving signal intensity information of a current packet from a receiving party that receives a packet transmitted from a sending party; and
   (b) dynamically adjusting the size of future transmission packets based on the received signal intensity information of the current packet, the size of the future transmission packets being determined by performing a mathematical operation involving a size of the current packet and the received signal intensity information of the current packet,
   wherein the mathematical operation represents setting the segment threshold to a smaller value between a predetermined maximum threshold value and a value obtained by multiplying a current segment threshold value by a value obtained by raising 2 to the power of the signal intensity level.

8. The method as claimed in claim 7, wherein (b) comprises:
   decreasing a size incremental rate for transmission packets, if the received signal intensity information of the current packet has a small value; and
   increasing the size incremental rate for transmission packets, if the received signal intensity information of the current packet has a large value.

9. An apparatus for managing a segment threshold, comprising:
   a plurality of packet transmission result input units, each of which receives a response message indicating that a packet has been successfully transmitted to a predetermined terminal without any errors;
   a plurality of received signal-intensity input units, each of which receives signal intensity information corresponding to a packet received by the predetermined terminal;
   a segment threshold adjustment unit for calculating and for adjusting the segment threshold based on whether the response message has been received and based on the input-signal intensity information, the segment threshold adjustment unit being configured to adjust the segment threshold by performing a mathematical operation involving a current threshold value and the received signal intensity data of the current packet; and
   a segment threshold management unit for outputting segment threshold information for performing packet segmentation according to the segment threshold adjusted by the segment threshold adjustment unit,
   wherein the mathematical operation represents setting the segment threshold to a smaller value between a predetermined maximum threshold value and a value obtained by multiplying a current segment threshold value by a value obtained by raising 2 to the power of the signal intensity level.

10. The apparatus as claimed in claim 9, wherein the segment threshold adjustment unit decreases the size of a transmission packet if the received signal intensity information has a small value, and increases the size of the transmitted packet if the received signal intensity information has a large value.

11. The apparatus as claimed in claim 9, wherein the segment threshold adjustment unit decreases a size incremental rate for transmission packets if the received signal intensity information has a small value, and increases the size incremental rate for transmission packets if the received input-signal intensity information has a large value.

12. The apparatus as claimed in claim 9, wherein the segment threshold management unit selects predetermined segment threshold information, corresponding to a target terminal to which data is to be transmitted from among segment threshold information input from the segment threshold adjustment unit, and outputs the predetermined segment threshold information so that a packet segmentation unit can perform packet segmentation based on the predetermined segment threshold information.

13. A non-transitory computer-readable recording medium on which a program enabling the method of claim 1 is recorded.

14. A non-transitory computer-readable recording medium on which a program enabling the method of claim 7 is recorded.

15. The method as claimed in claim 1, wherein adjusting the segment threshold is based directly on the received signal intensity data of the current packet.

16. The method as claimed in claim 1, wherein adjusting the segment threshold is based on a current segment threshold value.

17. The method as claimed in claim 1, wherein, after receiving the response message indicating that the predetermined terminal has received the packet without any errors, adjusting the segment threshold is solely based on the received signal intensity data of the current packet.

* * * * *